United States Patent
Sarkar et al.

(10) Patent No.: US 10,269,078 B2
(45) Date of Patent: Apr. 23, 2019

(54) NETWORK ANALYSIS OF TRANSACTION DATA FOR TARGET IDENTIFICATION

(71) Applicant: Accenture Global Solutions Limited, Dublin (IE)

(72) Inventors: Avik Sarkar, Singapore (SG); Bodhisatwa Guha, Kolkata (IN); Denis Dorssers, Singapore (SG); Kamolchanok Kriengchaipruck, Bangkok (TH); Paul Ng, Singapore (SG); Anand Sundaresan, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 388 days.

(21) Appl. No.: 15/086,768

(22) Filed: Mar. 31, 2016

(65) Prior Publication Data

US 2017/0236216 A1    Aug. 17, 2017

(30) Foreign Application Priority Data

Feb. 15, 2016    (IN) .............................. 201641005229

(51) Int. Cl.
  *G06Q 40/00*    (2012.01)
  *G06Q 50/00*    (2012.01)
(52) U.S. Cl.
  CPC .............. *G06Q 40/12* (2013.12); *G06Q 50/01* (2013.01)
(58) Field of Classification Search
  CPC ................................. G06Q 40/12; G06Q 50/01
  USPC ........................................................ 705/30
  See application file for complete search history.

(56) References Cited

U.S. PATENT DOCUMENTS

| | | | | |
|---|---|---|---|---|
| 2008/0077461 A1* | 3/2008 | Glick | ..................... | G06Q 10/06 705/7.29 |
| 2011/0166911 A1* | 7/2011 | Newman | ................ | G06Q 30/02 705/7.33 |
| 2014/0278741 A1* | 9/2014 | Batra | ................. | G06Q 30/0201 705/7.29 |

(Continued)

OTHER PUBLICATIONS

Singapore Search Report corresponding to 10201700573S dated Jul. 20, 2017, 3 pages.

*Primary Examiner* — A. Hunter Wilder
*Assistant Examiner* — Joseph M Mutschler
(74) *Attorney, Agent, or Firm* — Harrity & Harrity, LLP (57) ABSTRACT

A device may generate a transaction network associated with a plurality of accounts. The plurality of accounts may include a set of client accounts associated with a set of clients of an account manager, and a set of non-client accounts associated with a set of non-clients of the account manager. The transaction network may identify transactions among the set of client accounts and the set of non-client accounts. The device may identify, based on the transaction network, a community of accounts including a subset of client accounts for which transactions satisfy a threshold, and a non-client account that has transacted with one of the subset of client accounts. The device may determine target information, associated with the non-client account, including information associated with targeting a non-client, associated with the non-client account, by the account manager. The device may provide the target information and information associated with the community of accounts.

20 Claims, 7 Drawing Sheets

(56) References Cited

U.S. PATENT DOCUMENTS

| | | | | |
|---|---|---|---|---|
| 2015/0154615 A1* | 6/2015 | Pawar | ................ | G06Q 30/0201 705/7.29 |
| 2015/0339678 A1* | 11/2015 | Hampapur | ......... | G06Q 30/0201 705/7.29 |
| 2016/0012474 A1* | 1/2016 | Srivastava | ......... | G06Q 30/0246 705/14.45 |
| 2016/0371792 A1* | 12/2016 | Luo | ................... | G06Q 30/0201 |

* cited by examiner

NETWORK ANALYSIS OF TRANSACTION DATA FOR TARGET IDENTIFICATION

RELATED APPLICATION(S)

This application is claims priority to the Indian Patent Application No. 201641005229, filed on Feb. 15, 2016, the content of which is incorporated by reference herein in its entirety.

BACKGROUND

An account manager may manage an account associated with a client. The account manager may facilitate transactions between the account and another account, such as another account managed by the account manager or an account managed by a different account manager. In some implementations, a client, associated with the account, may initiate the transaction with the other account.

SUMMARY

According to some possible implementations, a method may comprise: generating, by a device, a transaction network associated with a plurality of accounts, where the plurality of accounts may include a set of client accounts associated with a set of clients of an account manager, where the plurality of accounts may include a set of non-client accounts associated with a set of non-clients of the account manager, and where the transaction network may identify transactions among the set of client accounts and the set of non-client accounts; identifying, by the device, a community of accounts based on the transaction network, where the community of accounts may include a subset of client accounts, of the set of client accounts, for which transactions, among the subset of client accounts, satisfy a threshold, and where the community of accounts may include a non-client account, of the set of non-client accounts, that has transacted with one of the subset of client accounts; determining, by the device, target information associated with the non-client account, where the target information may include information associated with targeting a non-client, associated with the non-client account, by the account manager; and providing, by the device, the target information and information associated with the community of accounts to cause another device to present the target information and the information associated with the community of accounts to the account manager.

According to some possible implementations, a device may comprise one or more processors to: generate a transaction network associated with a set of client accounts and a set of non-client accounts, where the set of client accounts may be associated with clients of an account manager, where the set of non-client accounts may be associated with non-clients of the account manager, and where the transaction network may identify transactions among the set of client accounts and the set of non-client accounts; determine community information based on the transaction network, where the community information may identify a subset of client accounts, of the set of client accounts, for which transactions, among the subset of client accounts, satisfy a threshold, and where the community information may identify a non-client account, of the set of non-client accounts, that has transacted with one or more client accounts of the subset of client accounts; determine target information, associated with the non-client account, that includes information associated with targeting a non-client, associated with the non-client account, by the account manager; and provide the target information and the community information.

According to some possible implementations, a non-transitory computer-readable medium may store instructions that, when executed by one or more processors, cause the one or more processors to: receive transaction data associated with a set of client accounts and a set of non-client accounts, where the set of client accounts may be associated with a set of clients of an account manager, and where the set of non-client accounts may be associated with a set of non-clients of the account manager; generate a transaction network based on the transaction data, where the transaction network may identify transactions among the set of client accounts and the set of non-client accounts; identify an account community based on the transaction network, where the account community may include a cluster of client accounts, of the set of client accounts, for which transactions, among the cluster of client accounts, satisfy a threshold, and where the account community may include a non-client account, of the set of non-client accounts, that has transacted with at least one client account of the cluster of client accounts; determine target information, associated with the non-client account, that includes information associated with contacting a non-client, associated with the non-client account, by the account manager; and provide the target information and information associated with the account community to permit the account manager to establish contact with the non-client.

DETAILED DESCRIPTION

The following detailed description of example implementations refers to the accompanying drawings. The same reference numbers in different drawings may identify the same or similar elements.

A relationship manager and/or an acquisition manager (herein collectively referred to as a relationship manager for the sake of simplicity), associated with an account manager (e.g., a bank, a financial institution), may be tasked with attracting entities (e.g., small-to-medium size enterprises (SMEs), corporations), that are not clients (herein referred to as non-clients) of the account manager, to open accounts (e.g., bank accounts, credit accounts, loan accounts) with the account manager. However, the relationship manager may not have a developed approach to identify a connection with a non-client that may be used to attract the non-client. Rather, the relationship manager may rely on known professional connections and/or personal connections in order to attract the non-client. Moreover, the relationship manager may have difficulty gaining insights to drive client acquisition and/or may spend a significant amount of resources gaining such insights. For example, the relationship manager may have difficulty identifying and/or spend a significant amount of time identifying value propositions to discuss with the non-client.

Implementations described herein may provide an analytics platform capable of analyzing transaction data, associated with an account manager, in order to identify a non-client for targeting by the account manager. In some implementations, the analytics platform may determine, based on the transaction data, community information that identifies connections between clients, associated with accounts of the account manager, and one or more non-clients (e.g., associated with accounts of one or more other account managers). The analytics platform may determine target information, associated with the one or more non-clients, and may provide the community information and/or the target information for use in attracting the one or more non-clients. For example, the analytics platform may provide the community information and/or the target information to a relationship manager associated with the account manager and/or to cause an action to be automatically performed, as described below.

FIGS. 1A-1D are diagrams of an overview of an example implementation 100 described herein. For the purposes of example implementation 100, assume that a transaction server, associated with a first account manager (e.g., AM1), stores or has access to transaction data related to transactions (e.g., financial transactions) associated with accounts of the first account manager (e.g., accounts of clients of the account manager).

Figure 1A:
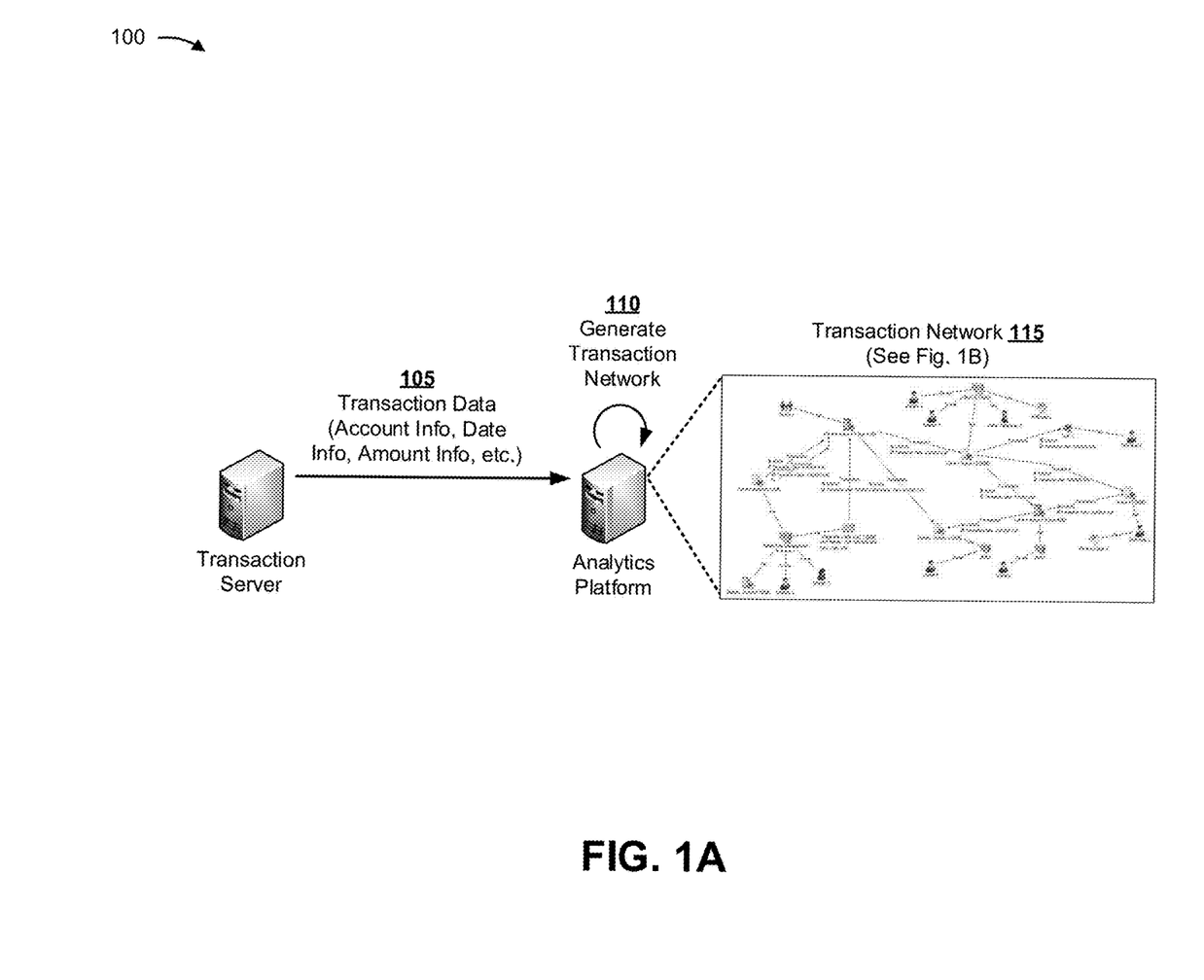
FIGS. 1A-1D are diagrams of an overview of an example implementation described herein.

As shown in FIG. 1A, and by reference number 105, the transaction server may provide the transaction data to an analytics platform associated with identifying non-clients for targeting by the first account manager. As shown, the transaction data may include information that identifies an account, such as an account number, an account manager associated with the account, a name associated with an account (e.g., a SME name, a corporation name, a business name, a first and last name, an owner name, a director name), a telephone number associated with the account, an account type (e.g., business, personal), or the like. As further shown, the transaction data may include information associated with transactions corresponding to the account, such as a date of each transaction, an amount of each transaction, a transaction type associated with the transaction (e.g., a business account, a bill payment, a foreign transaction), information that identifies a counterpart account associated with the transaction (e.g., an account to which and/or from which funds were sent and/or received), or the like.

As shown by reference number 110, the analytics platform may receive the transaction data, and may generate a transaction network (e.g., transaction network 115) based on the transaction data. The transaction network may include a network that describes transactions between accounts identified in the transaction data.

Figure 1B:
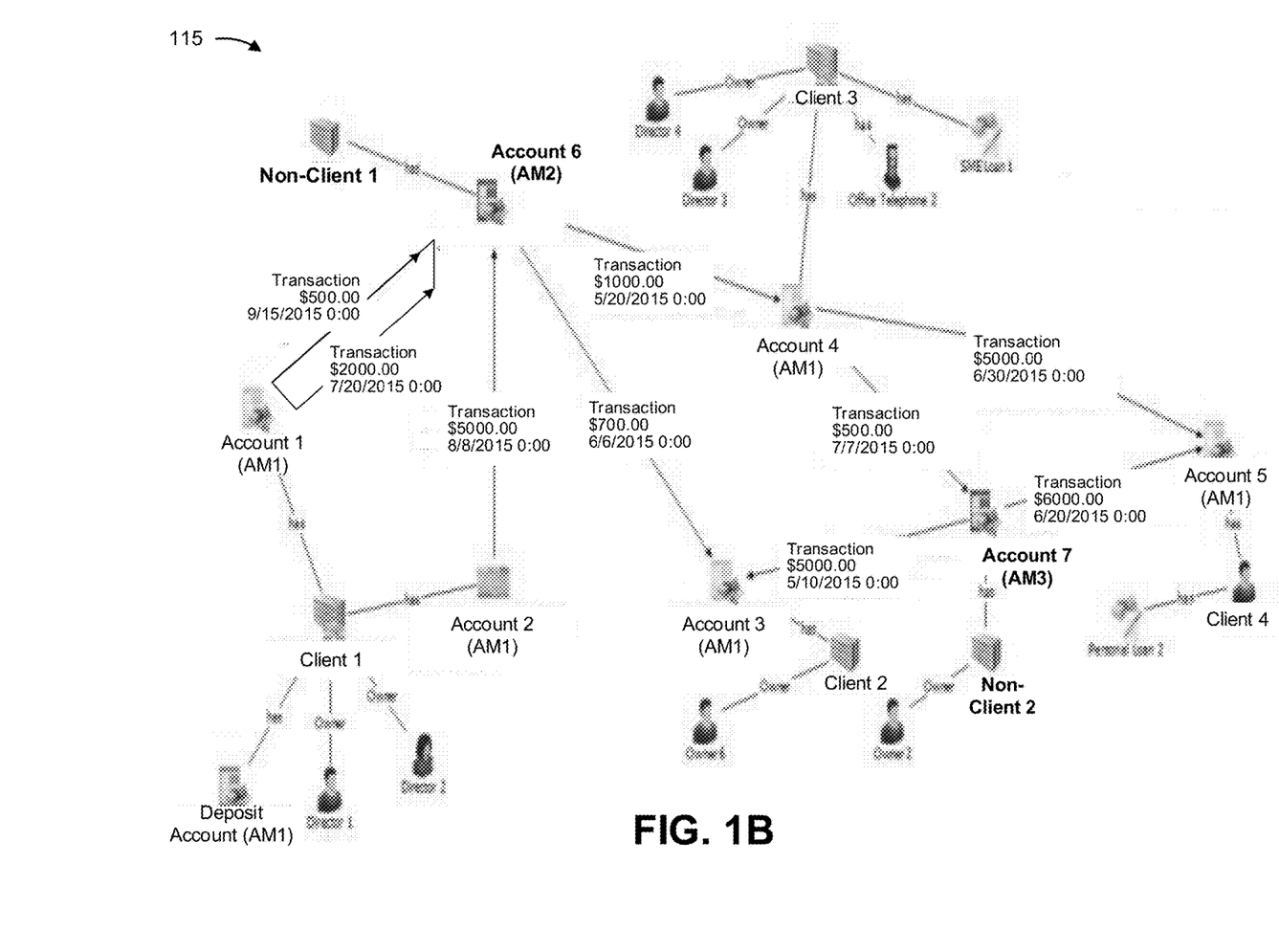

FIG. 1B is a diagram of an example transaction network generated by the analytics platform based on the transaction data. As shown, the transaction network may include information associated with transactions between accounts managed by the first account manager (e.g., an account manager that provided the transaction data). For example, the transaction network may include information that identifies transactions between a set of accounts (e.g., account 1 through account 5), associated with a set of clients (e.g., client 1 through client 4), that are managed by the first account manager.

As shown, the transaction network may also include information that identifies accounts associated with clients of other account managers. For example, the transaction network may include information that identifies an account associated with a second account manager (e.g., account 6, managed by AM2 and associated with non-client 1) and an account associated with a third account manager (e.g., account 7, managed by AM3 and associated with non-client 2). In other words, the transaction network may include information associated with transactions related to accounts of non-clients of the first account manager. In some implementations, the transaction network may include information associated with a significant number of client and/or non-client accounts and/or transactions (e.g., hundreds or thousands of accounts, hundreds or thousands of transactions).

Figure 1C:
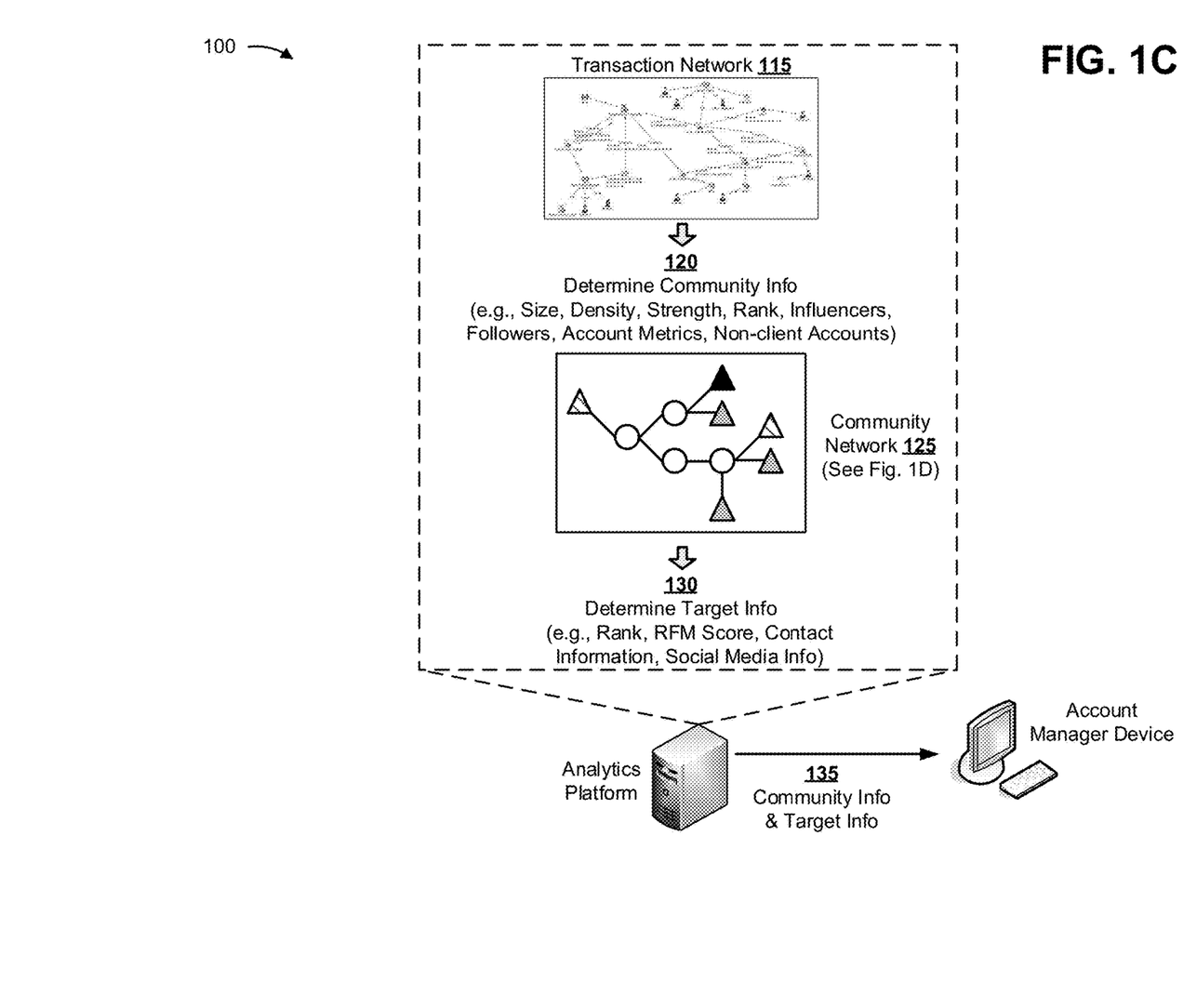

As shown in FIG. 1C, and by reference number 120, the analytics platform may determine community information based on the transaction network. The community information may include information associated with a community identified based on the transaction network. A community (sometimes referred to as an account community) may include one or more sets of connected accounts, associated with clients and/or non-clients of the account manager, within the transaction network. For example, the community may include a set of client accounts and/or non-client accounts between which a threshold number of transactions have occurred, a threshold frequency of transactions have occurred, a threshold amount of funds have been transferred, or the like. As another example, the community may include a set of client accounts and/or non-client accounts that have transacted with a common set of accounts. In some implementations, the community may be formed using logic based on the theory of graph partitioning and/or clustering of nodes.

In some implementations, the community may include one or more sets of connected accounts that may be described by a community network (e.g., community network 125). The community network may include a network that describes connections between accounts of the community and/or sets of accounts included in the community. In some implementations, the community network may include one or more account clusters, where each cluster may be associated with a set of the accounts included in the community. For example, a cluster may correspond to accounts associated with a particular client, accounts associated with a particular group of clients, or the like. Additionally, or alternatively, the community network may include one or more communities.

In some implementations, the community information may include information associated with a characteristic of the community (e.g., a size, a density, a strength, a rank), information that identifies an influencer account included in the community, information that identifies a follower account included in the community, an account metric associated with accounts included in the community, information associated with non-client accounts included in the community, or the like. Such information may be used to evaluate validity or value of the community, as described below. Additional details regarding these various types of community information are described below with regard to FIG. 4.

Figure 1D:
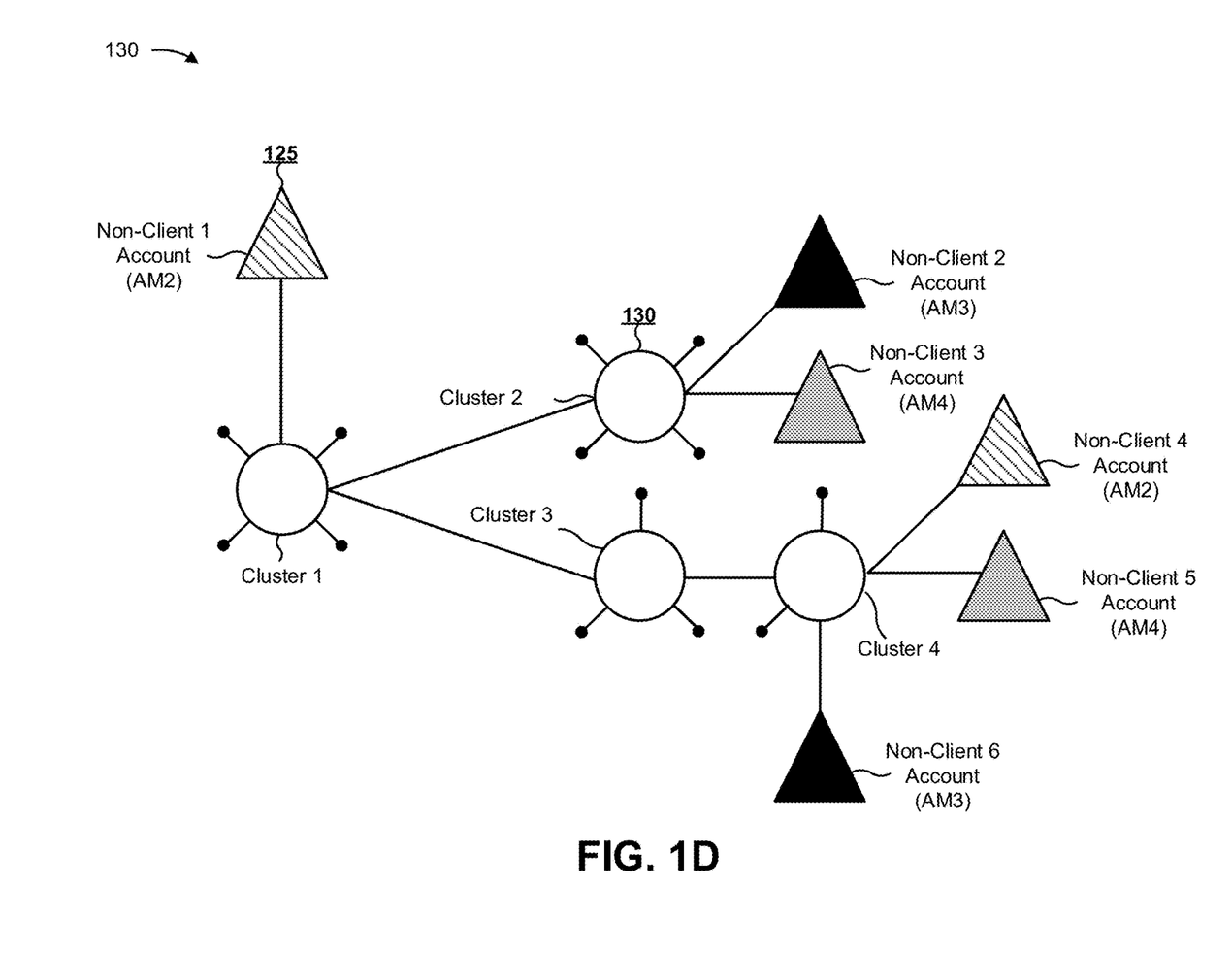

FIG. 1D is a diagram of an example community network determined by the analytics platform. As shown in FIG. 1D, the community network may include a set of clusters (e.g., cluster 1 through cluster 4) and a set of non-client accounts (e.g., non-client 1 account through non-client 6 account) associated with other account managers (e.g., AM2, AM3, and AM4). As shown, the community network may identify connections between the set of clusters and the set of non-client accounts. In some implementations, the analytics platform may determine community information for the community and/or one or more clusters included in the community. For example, the analytics platform may identify an influencer account (sometimes referred to as a leader account or an alpha account) for the overall community, each cluster of the community, or the like.

In some implementations, the community network may be used to identify an avenue via which the first account manager (e.g., a relationship manager) may attract a non-client. For example, assume that cluster 1 is associated with a client (e.g., a first SME), and that the non-client 1 account is associated with a non-client (e.g., a second SME). Here, since the community network identifies a connection between cluster 1 and the non-client 1 account, the first account manager may identify cluster 1 (e.g., a person associated with an influencer account of cluster 1, such as a director or owner of the first SME) as an avenue via which to contact the second SME.

As another example, assume that cluster 2 is associated with another particular client (e.g., a third SME), and that the non-client 3 account is associated with another non-client (e.g., a corporation). Here, the first account manager may identify cluster 2 (e.g., a person associated with an influencer account of cluster 2) as an avenue via which to contact the corporation (rather than contacting the corporation via the first SME, since the first SME is not connected to the non-client 2 account).

Returning to FIG. 1C, and as shown by reference number 130, the analytics platform may determine target information based on the community information. The target information may include information associated with one or more non-clients, associated with non-client accounts included in the community, that may be targeted by the account manager. For example, the target information may include a score associated with the non-client (e.g., a recency-frequency-monetary (RFM) score), a rank associated with the non-client, contact information associated with the non-client, social media information associated with the non-client (e.g., information that identifies shared social media contacts), or the like. In some implementations, the analytics platform may determine the target information based on analyzing the community information and/or the community network.

As shown by reference number 135, the analytics platform may provide the community information and/or the target information. For example, as shown, the analytics platform may provide the community and/or the target information to an account manager device associated with the account manager. The account manager device may receive the community information and/or the target information, and may provide the community information and/or the target information for display to the account manager (e.g., the relationship manager). In this way, an analytics platform may analyze transaction data, associated with an account manager, in order to identify a non-client for targeting by the account manager. Here, computer resources of the account manager device may be conserved since the community information and/or the target information may allow the account manager to quickly and/or readily identify a non-client target, thus using requiring less resource consumption by the account manager device.

In some implementations, the analytics platform may provide the community information and/or the target information to cause an action to be automatically performed based on the community information and/or the target information. For example, the analytics platform may provide the community information to cause a report, associated with accounts included in the community, to be automatically generated. As another example, the analytics platform may provide the target information to cause a message to be automatically sent to a non-client identified in the target information, to cause a meeting to be automatically scheduled with the non-client identified in the target information, or the like.

In some implementations, determination of the community information and/or the target information in this manner may conserve resources associated with the account manager. For example, determination of the community information and the target information by the (e.g., cloud-based) analytics platform may conserve processing resources and/or memory resources associated with the account manager device in association with identifying non-clients for targeting (e.g., since the account manager device need not consume resources in order to identify the non-client targets).

As indicated above, FIGS. 1A-1D are provided merely as an example. Other examples are possible and may differ from what was described with regard to FIGS. 1A-1D.

Figure 2:
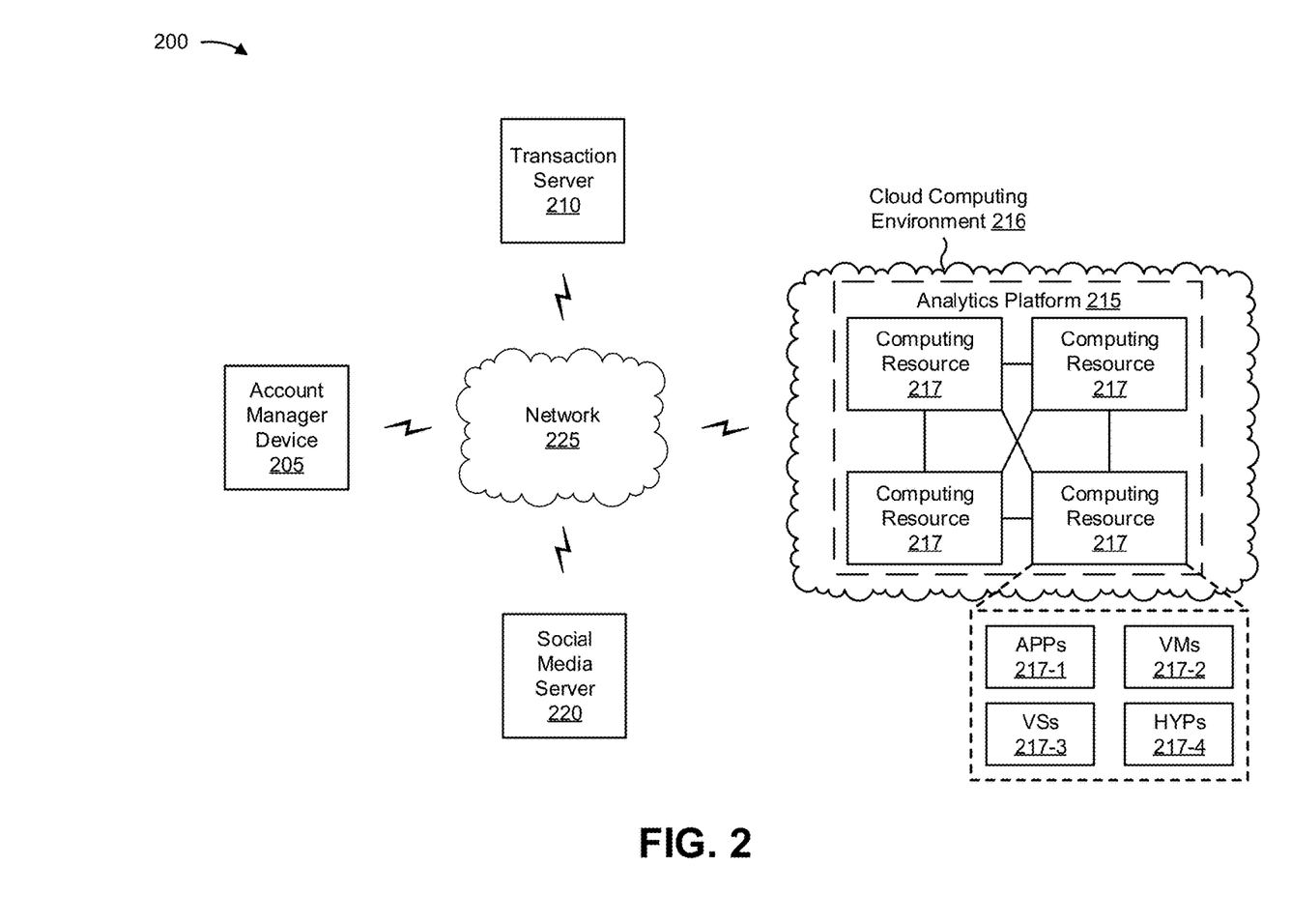
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an account manager device 205, a transaction server 210, an analytics platform 215 hosted within a cloud computing environment 216, a social media server 220, and a network 225. Devices of environment 200 may interconnect via wired connections, wireless connections, or a combination of wired and wireless connections.

Account manager device 205 includes one or more devices capable of receiving, storing, and/or providing community information and/or target information determined by analytics platform 215. For example, account manager device 205 may include a communication and computing device, such as a mobile phone (e.g., a smart phone, a radiotelephone), a laptop computer, a desktop computer, a tablet computer, a handheld computer, a wearable communication device (e.g., a smart wristwatch, a pair of smart eyeglasses), a server, a group of servers, or a similar type of device.

Transaction server 210 includes one or more devices capable of receiving, storing, and/or providing transaction data associated with one or more account transactions. For example, transaction server 210 may include a server or a group of servers. In some implementations, transaction server 210 may be associated with one or more account managers (e.g., transaction server 210 may store transaction data associated with accounts managed by one or more account managers).

Analytics platform 215 includes one or more devices capable of receiving transaction data, generating a transaction network based on the transaction data, determining community information and/or target information based on the transaction network, and providing the community and/or or the target information. For example, analytics platform 215 may include a server or a group of servers. In some implementations, as shown, analytics platform 215 may be hosted in cloud computing environment 216. Notably, while implementations described herein describe analytics platform 215 as being hosted in cloud computing environment 216, in some implementations, analytics platform 215 may not be cloud-based (i.e., may be implemented outside of a cloud computing environment) or may be partially cloud-based.

Cloud computing environment 216 includes an environment that host analytics platform 215. Cloud computing environment 216 may provide computation, software, data access, storage, services that do not require end-user (e.g., account manager device 205) knowledge of a physical location and configuration of system(s) and/or device(s) that hosts analytics platform 215. As shown, cloud computing environment 216 may include a group of computing resources 217 (referred to collectively as "computing resources 217" and individually as "computing resource 217").

Computing resource 217 includes one or more personal computers, workstation computers, server devices, or another type of computation and/or communication device. In some implementations, computing resource 217 may host analytics platform 215. The cloud resources may include compute instances executing in computing resource 217, storage devices provided in computing resource 217, data transfer devices provided by computing resource 217, or the like. In some implementations, computing resource 217 may communicate with other computing resources 217 via wired connections, wireless connections, or a combination of wired and wireless connections.

As further shown in FIG. 2, computing resource 217 may include a group of cloud resources, such as one or more applications ("APPs") 217-1, one or more virtual machines ("VMs") 217-2, virtualized storage ("VSs") 217-3, one or more hypervisors ("HYPs") 217-4, or the like.

Application 217-1 includes one or more software applications that may be provided to or accessed by account manager device 205. Application 217-1 may eliminate a need to install and execute the software applications on account manager device 205. For example, application 217-1 may include software associated with analytics platform 215 and/or any other software capable of being provided via cloud computing environment 216. In some implementations, one application 217-1 may send/receive information to/from one or more other applications 217-1, via virtual machine 217-2.

Virtual machine 217-2 includes a software implementation of a machine (e.g., a computer) that executes programs like a physical machine. Virtual machine 217-2 may be either a system virtual machine or a process virtual machine, depending upon use and degree of correspondence to any real machine by virtual machine 217-2. A system virtual machine may provide a complete system platform that supports execution of a complete operating system ("OS"). A process virtual machine may execute a single program, and may support a single process. In some implementations, virtual machine 217-2 may execute on behalf of a user (e.g., account manager device 205), and may manage infrastructure of cloud computing environment 216, such as data management, synchronization, or long-duration data transfers.

Virtualized storage 217-3 includes one or more storage systems and/or one or more devices that use virtualization techniques within the storage systems or devices of computing resource 217. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 217-4 provides hardware virtualization techniques that allow multiple operating systems (e.g., "guest operating systems") to execute concurrently on a host computer, such as computing resource 217. Hypervisor 217-4 may present a virtual operating platform to the guest operating systems, and may manage the execution of the guest operating systems. Multiple instances of a variety of operating systems may share virtualized hardware resources.

Social media server 220 includes a device capable of receiving, determining, processing, storing, and/or providing social media information. For example, social media server 220 may include a server or a group of servers. In some implementations, social media server 220 may provide social media information, associated with one or more non-clients, to analytics platform 215 and/or account manager device 205.

Network 225 includes one or more wired and/or wireless networks. For example, network 225 may include a cellular network (e.g., a long-term evolution (LTE) network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
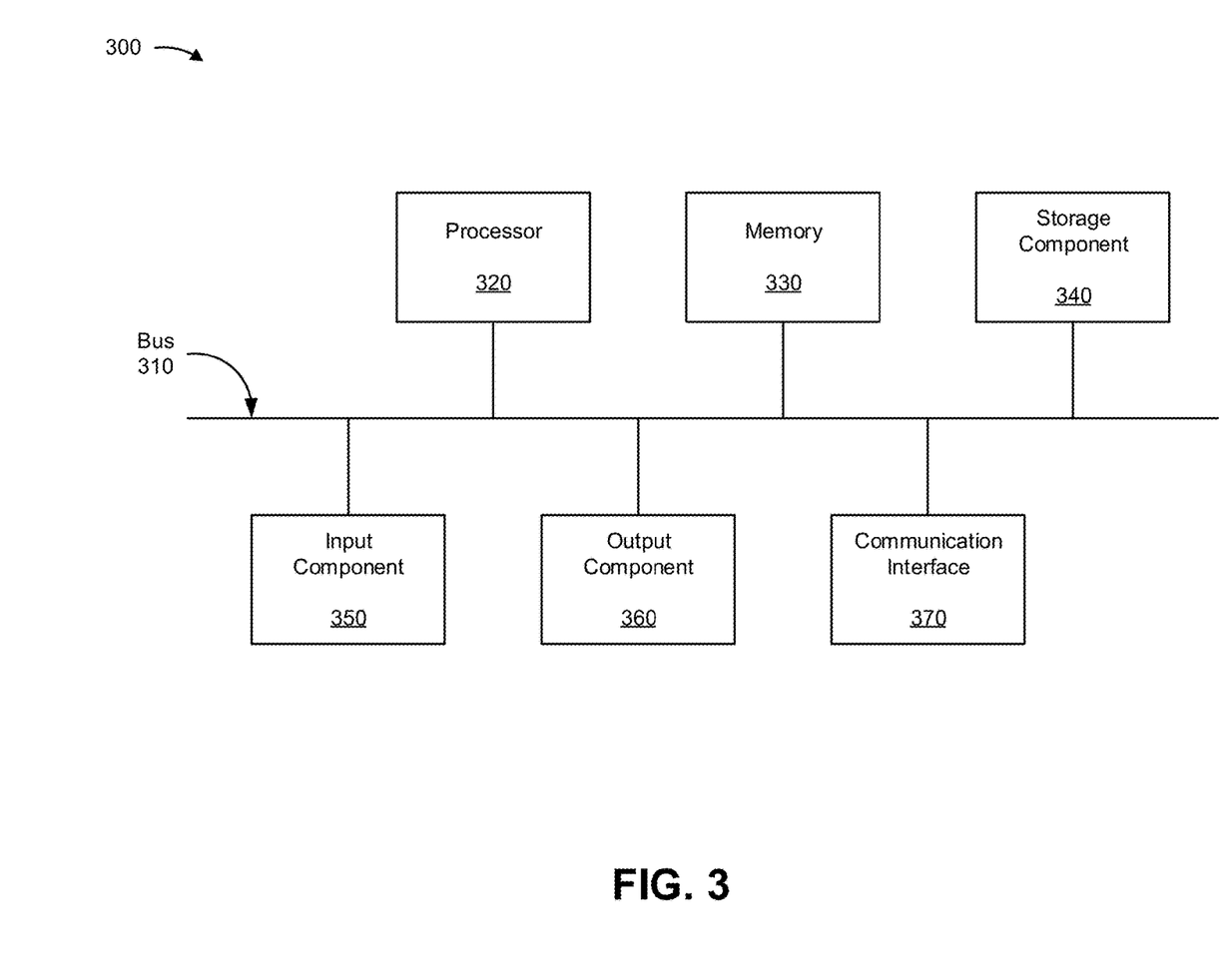
FIG. 3 is a diagram of example components of one or more devices of FIG. 2.

FIG. 3 is a diagram of example components of a device 300. Device 300 may correspond to account manager device 205, transaction server 210, analytics platform 215, and/or social media server 220. In some implementations, account manager device 205, transaction server 210, analytics platform 215, and/or social media server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), an accelerated processing unit (APU)), a microprocessor, and/or any processing component (e.g., a field-programmable gate array (FPGA), an application-specific integrated circuit (ASIC)) that interprets and/or executes instructions. In some implementations, processor 320 may include one or more processors that can be programmed to perform a function. Memory 330 includes a random access memory (RAM), a read only memory (ROM), and/or another type of dynamic or static storage device (e.g., a flash memory, a magnetic memory, an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone). Additionally, or alternatively, input component 350 may include a sensor for sensing information (e.g., a global positioning system (GPS) component, an accelerometer, a gyroscope, an actuator). Output component 360 includes a component that provides output information from device 300 (e.g., a display, a speaker, one or more light-emitting diodes (LEDs)).

Communication interface 370 includes a transceiver-like component (e.g., a transceiver, a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A non-transitory computer-readable medium is defined herein as a non-transitory memory device. A memory device includes memory space within a single physical storage device or memory space spread across multiple physical storage devices.

Software instructions may be read into memory 330 and/or storage component 340 from another non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
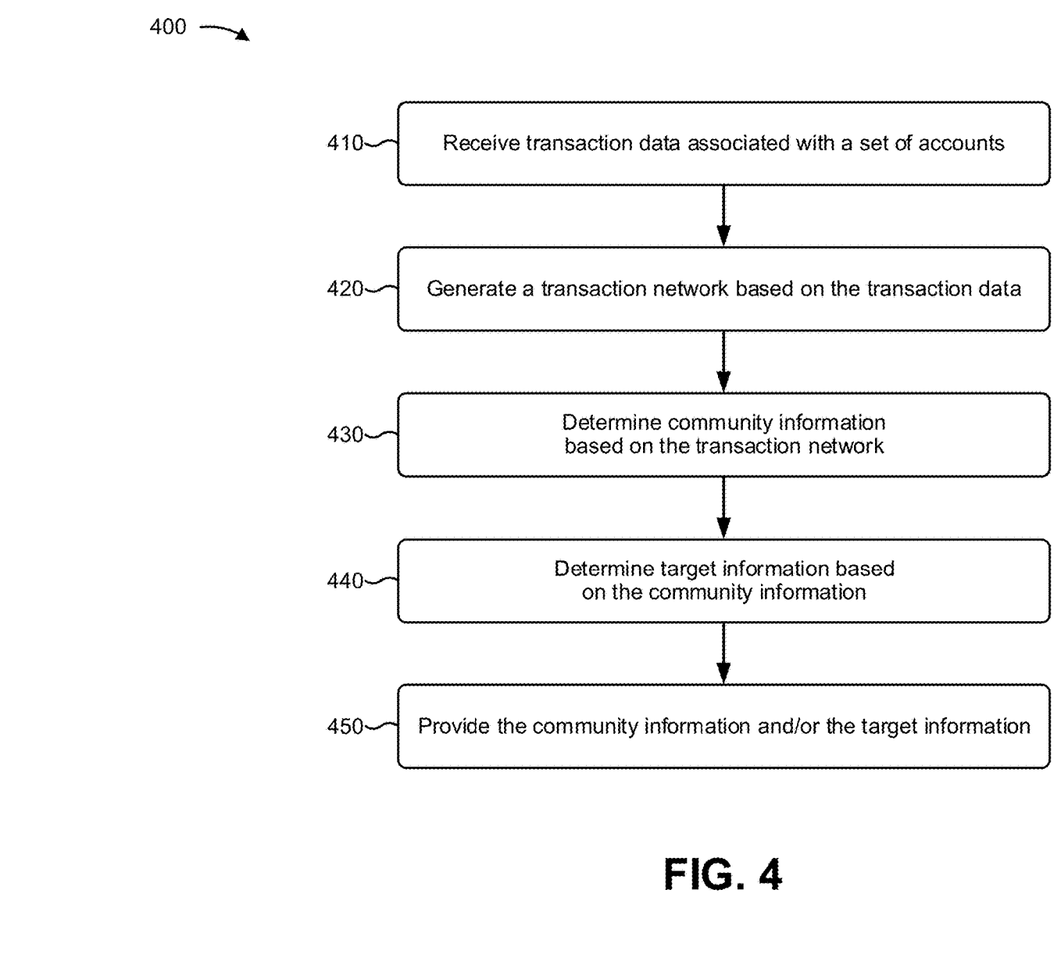
FIG. 4 is a flow chart of an example process for generating a transaction network based on transaction data, and determining community information and target information based on the transaction network.

FIG. 4 is a flow chart of an example process 400 for generating a transaction network based on transaction data, and determining community information and target information based on the transaction network. In some implementations, one or more process blocks of FIG. 4 may be performed by analytics platform 215. In some implementations, one or more process blocks of FIG. 4 may be performed by another device or a group of devices separate from or including analytics platform 215, such as account manager device 205, transaction server 210, and social media server 220.

As shown in FIG. 4, process 400 may include receiving transaction data associated with a set of accounts (block 410). For example, analytics platform 215 may receive transaction data associated with a set of accounts. In some implementations, analytics platform 215 may receive the transaction data when another device provides the transaction data, such as transaction server 210.

As described above, the transaction data may include information related to transactions associated with accounts managed by an account manager. For example, the transaction data may include information that identifies an account, such as an account number, an account manager associated with the account, a name (e.g., a name of a client, a name of a person associated with the client) associated with an account, a telephone number associated with the account, or the like. The transaction data may include information associated with transactions corresponding to the account, such as a date of each transaction, an amount of each transaction, information that identifies a counterpart account associated with the transaction (e.g., an account to which and/or from which funds were sent and/or received), or the like.

In some implementations, analytics platform 215 may receive the transaction data based on sending a request. For example, analytics platform 215 may send (e.g., based on user input, automatically at particular intervals of time) a request for transaction data to transaction server 210 and may receive the transaction data in a response to the request.

Additionally, or alternatively, analytics platform 215 may automatically receive the transaction data. For example, transaction server 210 may be configured to automatically provide the transaction data to analytics platform 215 at particular intervals of time (e.g., once every 24 hours, every night at a particular time), when transaction server 210 receives additional transaction data (e.g., associated with recent transactions), or the like. In some implementations, the transaction data may be processed using an extract, transform, and load (ETL) procedure as the transaction data is provided from transaction server 210 to analytics platform 215.

In some implementations, analytics platform 215 may filter the transaction data based on receiving the transaction data. For example, analytics platform 215 may filter the transaction data to remove transaction data associated with one or more transaction types not of interest to the account manager, such as a bill payment transactions, a transaction associated with a foreign account, or the like. As another example, analytics platform 215 may filter the transaction to remove transaction data associated with one or more account types, such as a personal accounts, or another type of non-business account. In some implementations, analytics platform 215 may be configured with one or more filters associated with filtering the transaction data. In some implementations, the account manager may adjust (e.g., turn-on, turn-off, adjust, modify) the one or more filters via account manager device 205.

Additionally, or alternatively, analytics platform 215 may prepare the transaction data based on receiving the transaction data. For example, analytics platform 215 may prepare the transaction data such that the transaction data is formatted for further analysis and/or processing by analytics platform 215. In this way, transaction data provided by different transaction servers 210 (e.g., in different formats) may be efficiently and effectively analyzed by analytics platform 215 (i.e., preparation of the transaction data may conserver computing resources of analytics platform 215).

As further shown in FIG. 4, process 400 may include generating a transaction network based on the transaction data (block 420). For example, analytics platform 215 may generate a transaction network based on the transaction data. In some implementations, analytics platform 215 may generate the transaction network after analytics platform 215 receives the transaction data. Additionally, or alternatively, analytics platform 215 may generate the transaction network when analytics platform 215 receives information indicating that analytics platform 215 is to generate the transaction network (e.g., automatically, based on user input).

As described above, the transaction network may include a network that describes transactions between accounts identified in the transaction data. In some implementations, analytics platform 215 may generate the transaction network based on analyzing the transaction data. For example, analytics platform 215 may identify a transaction involving a first account and a second account, a transaction involving the first account and a third account, a transaction involving the third account and a fourth account, and may generate the transaction network such that the transaction network identifies each transaction and the associated accounts (e.g., a link between the first and second accounts, a link between the first and third accounts, a link between the third and fourth accounts).

In some implementations, a node of the transaction network may include information associated with an account included in the transaction data, while a link between the node and another node may include information associated with a transaction between the account and another account. In some implementations, as described above with regard to FIG. 1B, the transaction network may include information associated with accounts of the account manager, non-client accounts (e.g., accounts managed by other account managers), and transactions amongst and between the client accounts and the non-client accounts.

As further shown in FIG. 4, process 400 may include determining community information based on the transaction network (block 430). For example, analytics platform 215 may analytics platform 215 may determine community information based on the transaction network. In some implementations, analytics platform 215 may determine the community information after analytics platform 215 generates the transaction network. Additionally, or alternatively, analytics platform 215 may determine the community information when analytics platform 215 receives information indicating that analytics platform 215 is to determine the community information (e.g., automatically, based on user input).

As described above, the community information may include information associated with one or more sets of connected accounts, associated with clients and/or non-clients of the account manager, identified based on the transaction network. For example, the community may include a set of two or more client accounts and/or non-client accounts among which a threshold number of transactions have occurred (e.g., 10 transactions, 20 transactions), a threshold frequency of transactions have occurred (e.g., five transactions during a one week period, 10 transactions during a one month period), a threshold amount of funds have been transferred (e.g., $5,000.00, $25,000.00), or the like.

In some implementations, analytics platform 215 may determine the community information based on analyzing the transaction network. For example, analytics platform 215 may analyze the transaction network using one or more network analysis techniques, and may identify one or more communities and create a community network, associated with the one or more communities, based on the analysis.

The community network may include a network that includes one or more clusters of connected accounts, as described above with regard to FIG. 1D. For example, the community network may include a single cluster of accounts, where each account included in the cluster is associated with a particular client of the account manager. As another example, the community network may include multiple clusters of accounts. In this example, a first cluster may correspond to a set of accounts associated with a first client, and a second cluster of accounts may correspond to a set of accounts associated with a second client. Here, analytics platform 215 may determine that the first cluster and the second cluster of accounts are connected (e.g., that transactions have occurred between accounts of the first cluster and accounts of the second cluster), but may not combine the first cluster and the second cluster since the first cluster of accounts and the second cluster of accounts are associated with different clients, or when, for example, transactions between accounts of the first and second clusters do not satisfy a threshold (e.g., a number of transactions, a frequency of transactions, an amount of funds involved in transactions), or the like.

Additionally, or alternatively, the community network may include information associated with non-client accounts. For example, the community network may include information that identifies non-client accounts that transact with the one or more clusters included in the community network.

In some implementations, analytics platform 215 may determine a community network that includes a single community. Additionally, or alternatively, analytics platform 215 may determine a community network that includes multiple communities. This may facilitate comparison of communities (e.g., in terms of a number of accounts, a number of targets, a number of shared targets) and/or identification of connections amongst the multiple communities.

In some implementations, analytics platform 215 may determine the community information corresponding to the community described by the community network. For example, analytics platform 215 may determine information associated with a characteristic of the community, such as a size (e.g., a number of accounts in the community), a density (e.g., a number of accounts included in the community as compared to a total number of accounts included in the transaction network, a set of communities, or the like), a strength (e.g., a degree of closeness among the accounts included in the community).

In some implementations, analytics platform 215 may determine a rank of the community based on one or more of the characteristics. For example, analytics platform 215 may determine characteristics (e.g., sizes, densities, and strengths) of multiple communities, may normalize the characteristics of the multiple communities, and may combine the normalized characteristics of each community to determine a community score for each community. Here, analytics platform 215 may rank each community based on comparing community scores amongst the communities.

Additionally, or alternatively, analytics platform 215 may determine community information that identifies an influencer account included in the community. The influencer account may include an account that is a central point for transactions within the community. For example, the influencer account may include an account, included in the community, involved in a highest number of transactions, a highest frequency of transactions, a highest amount of funds transacted, a number of transactions that satisfies an influencer threshold, a frequency of transactions that satisfies an influencer threshold, an amount of funds transacted that satisfies an influencer threshold, or the like. In some implementations, analytics platform 215 may identify one or more influencer accounts in a single community (e.g., a single influencer account for a community, an influencer account corresponding to each cluster included in the community).

Similarly, analytics platform 215 may determine community information that identifies a follower account included in the community (sometimes referred to as an omega account). The follower account may include an account that is involved in transactions (e.g., any number of transactions, a threshold number of transactions) with the influencer account. In some implementations, analytics platform 215 may identify one or more follower accounts associated with the influencer account.

Additionally, or alternatively, analytics platform 215 may determine community information that identifies an account metric associated with accounts included in the community. The account metric may include, for example, an account degree (e.g., a total number of incoming and/or outgoing transactions associated with the account), an account score (e.g., a value that indicates an importance of the account within the community in terms of funds received and/or funds sent), an account rank among other accounts of the community (e.g., based on the account degree, the account score, or the like).

Additionally, or alternatively, analytics platform 215 may determine information associated with a non-client account included in the community. The information associated with the non-client account may include, for example, information that identifies the non-client account (e.g., an account number, a name of the non-client, a type of the non-client account), an account manager associated with the non-client account, a total number of transactions involving the non-client account, a total amount of funds associated with transactions involving the non-client account, a frequency of transactions involving the non-client account, or the like.

As further shown in FIG. 4, process 400 may include determining target information based on the community information (block 440). For example, analytics platform 215 may determine target information based on the community information. In some implementations, analytics platform 215 may determine the target information when (e.g., before, after, concurrently with) analytics platform 215 determines the community information. Additionally, or alternatively, analytics platform 215 may determine the target information when analytics platform 215 receives information indicating that analytics platform 215 is to determine the target information (e.g., automatically, based on user input).

As described above, the target information may include information associated with one or more non-clients, corresponding to non-client accounts included in the community, that may be targeted by the account manager. For example, the target information may include a target score associated with the non-client (e.g., a RFM score), a target rank associated with the non-client, contact information associated with the non-client, social media information associated with the non-client (e.g., information that identifies social media contacts shared between the non-client and the account manager), or the like.

In some implementations, analytics platform 215 may determine the target score based on information associated with transactions between the non-client account, corresponding to the non-client, and the community (e.g., one or more clusters) with which the non-client account transacts. For example, analytics platform 215 may determine information associated with transactions between the non-client account and client accounts included in the community, and may compute an RFM score based on the information associated with the transactions.

In some implementations, analytics platform 215 may determine the target rank based on scores for one or more non-client accounts associated with multiple non-clients. For example, analytics platform 215 may determine RFM scores for multiple non-client accounts included in the community, and may compare the RFM scores to determine a rank associated with each of the multiple non-clients.

Additionally, or alternatively, analytics platform 215 may determine contact information associated with the non-client. For example, analytics platform 215 may determine a name of the non-client based on the information associated with the non-client account, such as a name of the non-client (e.g., a name of an SME, a name of a corporation). Here, analytics platform 215 may automatically perform a search (e.g., a search of information stored or accessible by analytics platform 215, an Internet search) in order to identify a point of contact (e.g., an owner, a director) of the non-client and/or contact details (e.g., an e-mail address, a telephone number, a postal address) with which to contact the non-client.

Additionally, or alternatively, analytics platform 215 may determine social media information associated with the non-client. For example, analytics platform 215 may determine the name of the non-client and/or the point of contact associated with the non-client, as described in the above example. Here, analytics platform 215 may provide information that identifies the non-client and/or the point of contact to social media server 220, along with information that identifies the account manager (e.g., a name of the relationship manager, names of employees of the account manager). In this example, social media server 220 may receive the information, and may determine, based on information stored or accessible by social media server 220, social media information that identifies one or more social media connections between the non-client and/or the point of contact and the account manager (e.g., the relationship manager, an employee of the account manager).

As further shown in FIG. 4, process 400 may include providing the community information and/or the target information (block 450). For example, analytics platform 215 may provide the community information and/or the target information. In some implementations, analytics platform 215 may provide the community information and/or the target information when analytics platform 215 determines the community information and/or determines the target information. Additionally, or alternatively, analytics platform 215 may provide the community information and/or the target information when analytics platform 215 receives information indicating that analytics platform 215 is to provide the community information and/or the target information (e.g., automatically, based on user input).

In some implementations, analytics platform 215 may provide the community information and/or the target information for display to a user. For example, analytics platform 215 may provide the community information and/or the target information to account manager device 205. Here, account manager device 205 may receive the community information and/or the target information, and may provide the community information and/or the target information for display to the relationship manager associated with account manager.

As an example, account manager device 205 may provide, for display, a user interface associated with the community network based on receiving the community information. In some implementations, the relationship manager may indicate (e.g., via interaction with the user interface) that the relationship manager wishes to view additional items of community information associated with the community network, such as information associated with the community, a cluster of the community, a non-client account included in the community, or the like, and account manager device 205 may update the user interface based on the community information.

As another example, account manager device 205 may provide for display, a user interface associated with the target information corresponding to one or more communities identified in the community information. For example, account manager device 205 may provide, for display, a list that includes one or more non-clients that is organized based on target rank. In some implementations, the relationship manager may indicate that the relationship manager wishes to view additional items of target information associated with a particular non-client (e.g., a point of contact, social media connections, or the like), and account manager device 205 may update the user interface based on the target information.

Additionally, analytics platform 215 may provide background information associated with one or more clients and/or non-clients identified in the community information. For example, analytics platform 215 may determine (e.g., based on information stored or accessible by analytics platform 215, based on an Internet search) background information associated with one or more clients and/or non-clients, such as a financial metric (e.g., revenue, profit, sales growth, gross profit margin, net profit margin), biographical information (e.g., a number of employees, a number of years in business, an industry type, a credit rating), or the like. Here, analytics platform 215 may provide the background information to account manager device 205, and account manager device 205 may provide the background information for display (e.g., along with the community information and/or the target information). This may conserve computing resources of account manager device 205 since account manager device 205 need not search for the background information.

Additionally, or alternatively, analytics platform 215 may provide the community information and/or the target information to cause an action to be automatically performed. For example, analytics platform 215 may provide the community information to cause a report, associated with non-client accounts included in a community, to be automatically generated and provided to the account manager. As another example, analytics platform 215 may provide the target information to cause a message (e.g., a voice message, an e-mail, a text message) to be automatically sent to a non-client target identified in the target information (e.g., a highest ranked target, a set of five top targets) and/or generated for review by the account manager. As yet another example, analytics platform 215 may provide the target information to cause a meeting to be automatically scheduled between the relationship manager and the non-client target identified in the target information (e.g., via a calendar application). As an additional example, analytics platform 215 may provide the target information to cause the non-client to target to be automatically contacted via a social media platform. As still another example, analytics platform 215 may provide the target information to cause a message to be automatically sent to a client who can provide an introduction to the non-client target.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may provide an analytics platform capable of analyzing transaction data, associated with an account manager, in order to identify a non-client for targeting by an account manager.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

receiving, by an analytics device and from a transaction server, transaction data associated with a plurality of accounts;

generating, by the analytics device and based on receiving the transaction data, a transaction network, associated with the plurality of accounts, that includes a plurality of nodes and a plurality of links, wherein:

the plurality of accounts includes a set of client accounts associated with a set of clients of an account manager, the plurality of accounts includes a set of non-client accounts associated with a set of non-clients of the account manager, the transaction network identifies transactions among the set of client accounts and the set of non-client accounts, a node, of the plurality of nodes, identifies an account among the set of client accounts and the set of non-client accounts, and a link, of the plurality of links, identifies a transaction of the transactions;

identifying, by the analytics device, a community of accounts based on the transaction network, wherein the community of accounts include a subset of client accounts, of the set of client accounts, for which transactions, among the subset of client accounts, satisfy a threshold, and the community of accounts including a non-client account, of the set of non-client accounts, that has transacted with one of the subset of client accounts;

determining, by the analytics device, an influencer account that is a central point for transactions within the community of accounts, wherein the influencer account is identified by a particular node, of the plurality of nodes, that satisfies a threshold quantity of links and a threshold quantity of funds transacted;

determining, by the analytics device and based on identifying the community of accounts and determining the influencer account, target information associated with the non-client account, wherein the target information includes information associated with targeting a non-client, associated with the non-client account, by the account manager;

providing, by the analytics device, background information associated with the non-client; and providing, by the analytics device, the target information and information associated with the community of accounts to cause an action to be performed, wherein the action includes at least one of:

automatically contacting the non-client via a social media platform, or automatically sending a message, generated for review by the account manager, to an account manager device of the account manager and sending the message to a non-client device associated with the non-client.

2. The method of claim 1, further comprising:

determining community information, associated with the community of accounts, that includes information associated with at least one of:

a size of the community of accounts;

a density of the community of accounts;

a strength of the community of accounts;

an account metric associated with the community of accounts; or a follower account included in the community of accounts; and wherein providing the information associated with the community of accounts comprises:

providing the community information.

3. The method of claim 2, further comprising:

comparing the community information, associated with the community of accounts, and other community information associated with another community of accounts; and determining, based on comparing the community information and the other community information, a rank associated with the community of accounts; and wherein providing the community information comprises:

providing information associated with the rank of the community of accounts.

4. The method of claim 1, further comprising:

determining, based on the transaction network, a community network that includes an account cluster, corresponding to the subset of client accounts, that is connected to the non-client account; and wherein identifying the community of accounts comprises:

identifying the community of accounts based on the account cluster that is connected to the non-client account.

5. The method of claim 1, wherein determining the target information comprises:

determining a recency-frequency-monetary (RFM) score associated with the non-client account; and wherein providing the target information comprises:

providing information associated with the RFM score.

6. The method of claim 1, further comprising:

comparing the target information, associated with the non-client account, and other target information associated with another non-client account; and determining, based on comparing the target information and the other target information, a rank associated with the non-client account; and wherein providing the target information comprises:

providing information associated with the rank associated with the non-client account.

7. The method of claim 1, wherein determining the target information comprises:

determining a rank associated with the non-client, and determining contact information associated with the non-client, or determining social media information, associated with the non-client, of the social media platform; and wherein providing the target information comprises:

providing information associated with:

the rank associated with the non-client, the contact information associated with the non-client, or the social media information associated with the non-client.

8. An analytics device, comprising:

a memory; and one or more processors configured to:

receive, from a transaction server, transaction data associated with a set of client accounts and a set of non-client accounts;

generate, based on receiving the transaction data, a transaction network, associated with the set of client accounts and the set of non-client accounts, that includes a plurality of nodes and a plurality of links,
wherein:
the set of client accounts are associated with clients of an account manager,
the set of non-client accounts are associated with non-clients of the account manager,
the transaction network identifies transactions among the set of client accounts and the set of non-client accounts,
a node, of the plurality of nodes, identifies an account among the set of client accounts and the set of non-client accounts, and
a link, of the plurality of links, identifies a transaction of the transactions;
determine community information based on the transaction network,
wherein:
the community information identifies a subset of client accounts, of the set of client accounts, for which transactions, among the subset of client accounts, satisfy a threshold, and
the community information identifies a non-client account, of the set of non-client accounts, that has transacted with one or more client accounts of the subset of client accounts;
determine an influencer account that is a central point for transactions within the transaction network,
wherein the influencer account is identified by a particular node, of the plurality of nodes, that satisfies a threshold quantity of links and a threshold quantity of funds transacted;
determine, based on determining the community information and determining the influencer account, target information, associated with the non-client account, that includes information associated with targeting a non-client, associated with the non-client account, by the account manager;
provide background information associated with the non-client; and
provide the target information and the community information to cause an action to be performed,
wherein the action includes at least one of:
automatically contacting the non-client via a social media platform, or
automatically sending a message, generated for review by the account manager, to an account manager device of the account manager and sending the message to a non-client device associated with the non-client.

9. The analytics device of claim 8, wherein the community information includes information associated with one or more of:
a number of client accounts in the subset of client accounts;
a density of the subset of client accounts;
a strength of the subset of client accounts;
an account metric associated with the subset of client accounts; or
a follower account included in the subset of client accounts.

10. The analytics device of claim 8, wherein the clients of the account manager and the non-clients of the account manager include small-to-medium size enterprises or corporations.

11. The analytics device of claim 8, wherein the one or more processors are further configured to:

filter the transaction data based on receiving the transaction data; and
prepare the transaction data based on filtering the transaction data; and
wherein the one or more processors, when generating the transaction network based on the transaction data, are configured to:
generate the transaction network based on preparing the transaction data.

12. The analytics device of claim 8, wherein the one or more processors are further configured to:
determine social media information, associated with the non-client, of the social media platform that includes information that identifies a social media contact associated with both the non-client and the account manager; and
provide the social media information associated with the non-client.

13. The analytics device of claim 8, wherein the background information includes financial metric or biographical information associated with the non-client.

14. The analytics device of claim 8, wherein the action further includes automatically scheduling a meeting via an application associated with the non-client device.

15. A non-transitory computer-readable medium storing instructions, the instructions comprising:
one or more instructions that, when executed by one or more processors, cause the one or more processors to:
receive, from a transaction server, transaction data associated with a set of client accounts and a set of non-client accounts,
wherein:
the set of client accounts are associated with a set of clients of an account manager, and
the set of non-client accounts are associated with a set of non-clients of the account manager;
generate, based on the transaction data, a transaction network that includes a plurality of nodes and a plurality of links,
wherein:
the transaction network identifies transactions among the set of client accounts and the set of non-client accounts,
a node, of the plurality of nodes, identifies an account among the set of client accounts and the set of non-client accounts, and
a link, of the plurality of links, identifies a transaction of the transactions;
identify an account community based on the transaction network,
wherein:
the account community includes a cluster of client accounts, of the set of client accounts, for which transactions, among the cluster of client accounts, satisfy a threshold, and
the account community includes a non-client account, of the set of non-client accounts, that has transacted with at least one client account of the cluster of client accounts;
determine an influencer account that is a central point for transactions within the transaction network,
wherein the influencer account is identified by a particular node, of the plurality of nodes, that satisfies a threshold quantity of links and a threshold quantity of funds transacted;
determine, based on identifying the account community and determining the influencer account, target information, associated with the non-client account, that includes information associated with contacting a non-client, associated with the non-client account, by the account manager;

provide background information associated with the non-client; and provide the target information and information associated with the account community to cause an action to be performed, wherein the action includes at least one of:
automatically contacting the non-client via a social media platform, or
automatically sending a message, generated for review by the account manager, to an account manager device of the account manager and sending the message to a non-client device associated with the non-client.

16. The non-transitory computer-readable medium of claim 15, wherein the one or more instructions, when executed by the one or more processors, further cause the one or more processors to:

determine community information, associated with the account community, that includes information associated with at least one of:
a size of the account community;
a density of the account community;
a strength of the account community;
an account metric associated with the account community; or
a follower account included in the account community; and wherein the one or more instructions, that cause the one or more processors to provide the information associated with the account community, cause the one or more processors to:
provide the community information.

17. The non-transitory computer-readable medium of claim 16, wherein the one or more instructions, when executed by the one or more processors, further cause the one or more processors to:

compare the community information, associated with the account community, and other community information associated with another account community; and determine, based on comparing the community information and the other community information, a rank associated with the account community; and wherein the one or more instructions, that cause the one or more processors to provide the community information, cause the one or more processors to:
provide information associated with the rank of the account community.

18. The non-transitory computer-readable medium of claim 15, wherein the one or more instructions, that cause the one or more processors to determine the target information, cause the one or more processors to:

determine a score corresponding to the non-client account; and wherein the one or more instructions, that cause the one or more processors to provide the target information, cause the one or more processors to:
provide information associated with the score corresponding to the non-client account.

19. The non-transitory computer-readable medium of claim 15, wherein the one or more instructions, when executed by the one or more processors, further cause the one or more processors to:

compare the target information, associated with the non-client account, and other target information associated with another non-client account; and determine, based on comparing the target information and the other target information, a rank associated with the non-client account; and wherein the one or more instructions, that cause the one or more processors to provide the information associated with account community, cause the one or more processors to:
provide information associated with the rank associated with the non-client account.

20. The non-transitory computer-readable medium of claim 15, wherein the one or more instructions, that cause the one or more processors to provide the target information and the information associated with the account community, cause the one or more processors to:

provide the target information and the information associated with the account community for display to a user associated with the account manager.

* * * * *